US012682077B2

(12) United States Patent
Siraj et al.

(10) Patent No.: US 12,682,077 B2
(45) Date of Patent: Jul. 14, 2026

(54) GENERATING THREAT STATEMENTS FOR A THREAT MODEL USING ARTIFICIAL INTELLIGENCE

(71) Applicant: Capital One Services, LLC, McLean, VA (US)

(72) Inventors: Urooj Siraj, McLean, VA (US); Caitlin Coffey, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 93 days.

(21) Appl. No.: 18/743,030

(22) Filed: Jun. 13, 2024

(65) Prior Publication Data

US 2025/0384140 A1     Dec. 18, 2025

(51) Int. Cl.
*G06F 21/57*        (2013.01)
*G06N 3/09*        (2023.01)

(52) U.S. Cl.
CPC ...... *G06F 21/577* (2013.01); *G06F 2221/034* (2013.01); *G06N 3/09* (2023.01)

(58) Field of Classification Search
CPC ........ G06N 20/00; G06N 3/09; G06F 18/214; G06F 21/577; G06F 2221/033; G06F 2212/1052; G06F 21/56; G06F 21/00
See application file for complete search history.

(56) References Cited

U.S. PATENT DOCUMENTS

| | | | |
|---|---|---|---|
| 2024/0314158 A1* | 9/2024 | Bourzikas | H04L 63/1441 |
| 2024/0420264 A1* | 12/2024 | Nesarikar | G06Q 50/265 |
| 2025/0045411 A1* | 2/2025 | Singh | G06F 21/552 |
| 2025/0124066 A1* | 4/2025 | McElvain | G06F 16/335 |

OTHER PUBLICATIONS https://learn.microsoft.com/en-us/azure/security/develop/threat-modeling-tool-getting-started (Year: 2024).*
https://learn.microsoft.com/en-us/azure/security/develop/threat-modeling-tool (Year: 2024).*
https://learn.microsoft.com/en-us/azure/security/develop/threat-modeling-tool-feature-overview (Year: 2024).*

* cited by examiner

*Primary Examiner* — Ali S Abyaneh
*Assistant Examiner* — Brandon Binczak
(74) *Attorney, Agent, or Firm* — Foley & Lardner LLP

(57)        ABSTRACT
Methods and systems are described herein for a threat modeling system. The threat modeling system may use machine learning and operator help to determine whether the threat model has errors and/or whether the threat model is complete. In particular, the threat modeling system may input each threat or threat statement within the threat model into a machine learning model that has been trained to detect errors within the threat model. When errors are detected, the threat modeling system may present those errors to an operator to be fixed. In addition, the threat modeling system may enable an operator to add new threats to the model and then check those threats for error and completeness.

20 Claims, 8 Drawing Sheets

*700*

100

200

| 203 | 206 | 209 | 212 |
| --- | --- | --- | --- |
| Function_1 | Function_2 | Function_3 | Function_4 |
| Function Code | Function Code | Function Code | Function Code |

| Threat Identifier | Score |
|---|---|
| Threat_1 | .9 |
| Threat_2 | .75 |
| Threat_3 | .2 |

ML Model 402

406

500

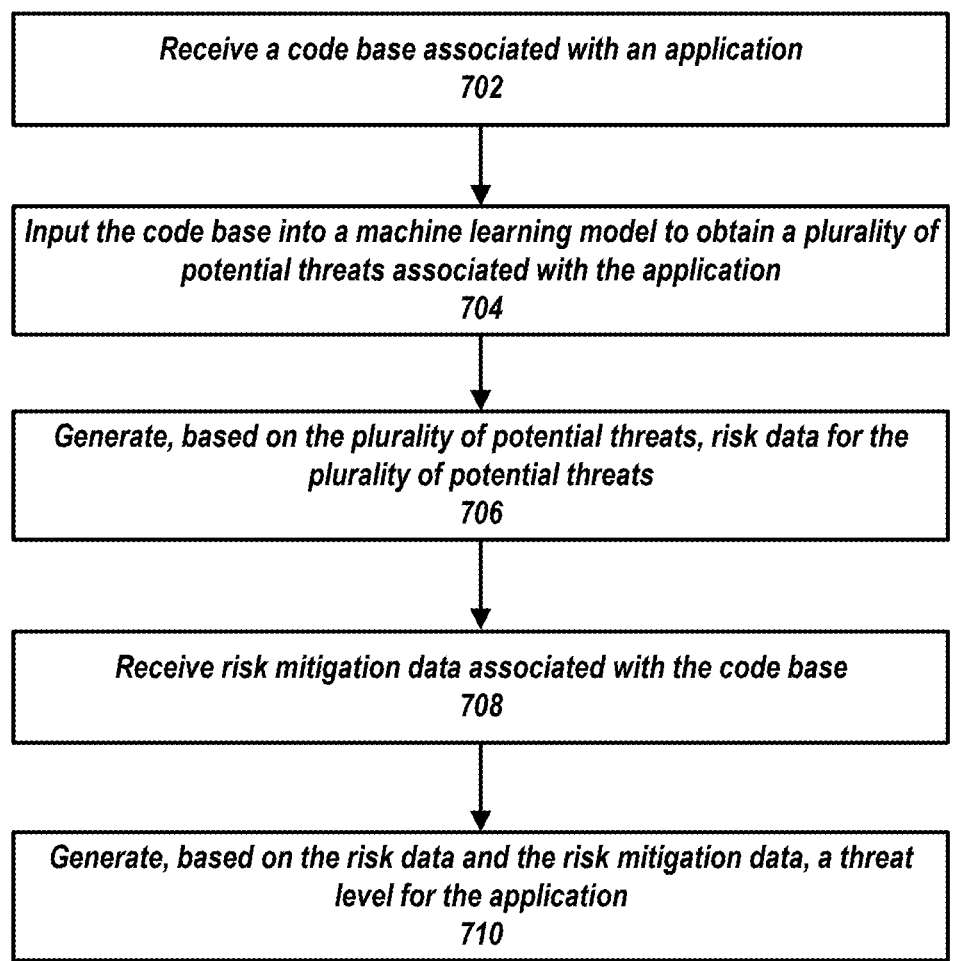

700

Receive a code base associated with an application
702

Input the code base into a machine learning model to obtain a plurality of
potential threats associated with the application
704

Generate, based on the plurality of potential threats, risk data for the
plurality of potential threats
706

Receive risk mitigation data associated with the code base
708

Generate, based on the risk data and the risk mitigation data, a threat
level for the application
710

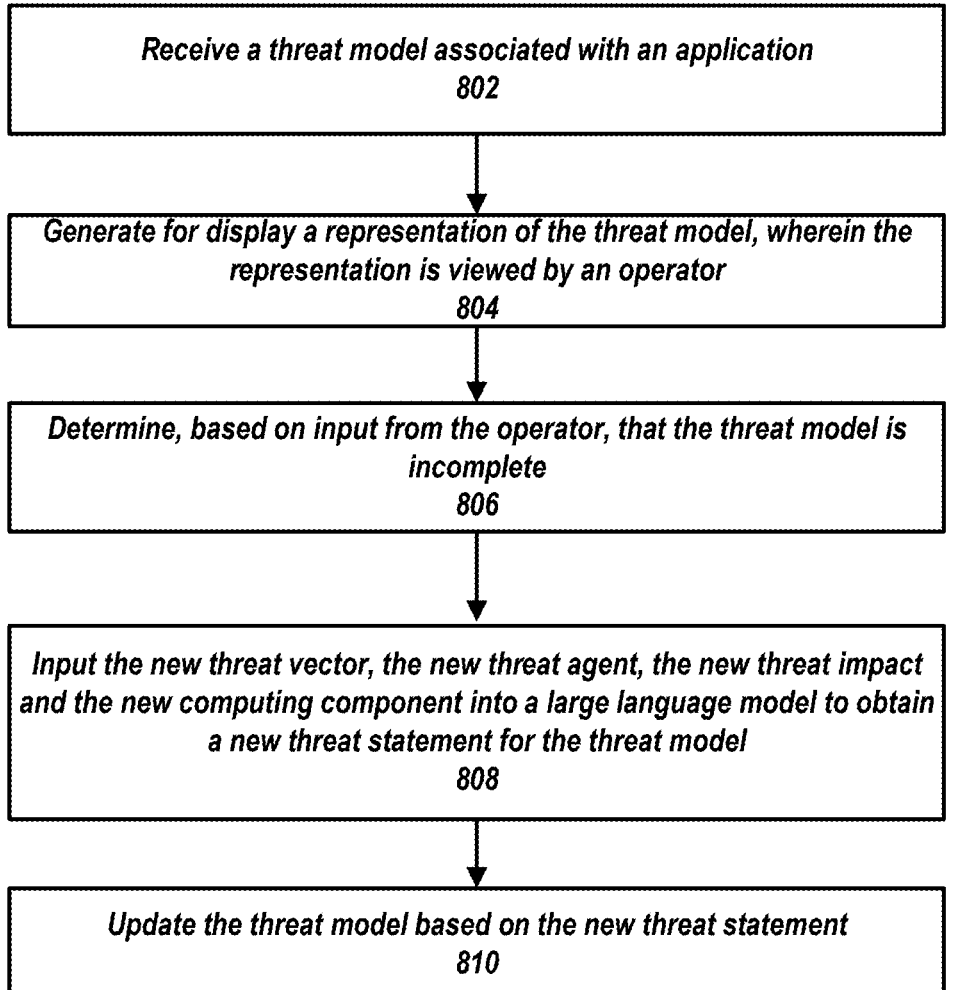

Receive a threat model associated with an application
802

Generate for display a representation of the threat model, wherein the
representation is viewed by an operator
804

Determine, based on input from the operator, that the threat model is
incomplete
806

Input the new threat vector, the new threat agent, the new threat impact
and the new computing component into a large language model to obtain
a new threat statement for the threat model
808

Update the threat model based on the new threat statement
810

FIG. 8

GENERATING THREAT STATEMENTS FOR A THREAT MODEL USING ARTIFICIAL INTELLIGENCE

SUMMARY

In recent years, a number of threats to computer systems have increased exponentially. Accordingly, robust threat management systems are required to deal with those threats. Many computer systems now run antivirus applications along with other threat detection and elimination systems. However, as new applications are designed and enabled, potential threats to those applications may be unknown and need to be identified, tracked, and addressed. Those potential threats may be identified, tracked, and addressed using threat models. However, a mechanism is needed for scoring and improving those threat models.

Therefore, methods and systems are described herein for identifying a threat level for an application. A threat modeling system may be used to perform operations disclosed herein. The threat modeling system may use a code base and/or an infrastructure diagram to generate a threat level for an application. In particular, the threat modeling system may input the code base (and in some embodiments the infrastructure diagram) into a machine learning model that has been trained to identify potential threats in computer code and/or within infrastructure diagrams. In response, the threat modeling system may receive potential threats identified by the machine learning model. Furthermore, the threat modeling system may retrieve risk mitigation data associated with the application and compare that risk mitigation data with risk data (e.g., with a threat library). Based on the comparison, the threat modeling system may determine a threat level for the application.

In some embodiments, the threat modeling system may perform the following operations when measuring a threat level associated with an application. The threat modeling system may receive a code base associated with an application. The code base may include computer code associated with the application. For example, the code base may include a plurality of functions and procedures for executing and using a particular application. In some embodiments, the code base may be textual data that is delimited in a particular way. For example, the code base may be stored in an XML format. In some embodiments, the threat modeling system may also receive an infrastructure diagram of the application. For example, the infrastructure diagram may include various computing nodes and connections being used by the application.

The threat modeling system may then use a machine learning model to identify threats associated with the application. In particular, the threat modeling system may input the code base into a machine learning model to obtain a plurality of potential threats associated with the application. The machine learning model may be one that has been trained to identify threats within code bases of applications. In some embodiments, the threat modeling system may also input an infrastructure diagram associated with the application in the machine learning model. Based on the input, the machine learning model may output one or more threat identifiers associated with one or more potential threats predicted for the application based on the code base. In some embodiments, the machine learning model may also take the infrastructure diagram of the application as an input and use that diagram in predicting the one or more potential threats for the application.

In some embodiments, prior to inputting the code base into the machine learning model, the threat modeling system may split the code base according to functions and/or procedures within the code base. The threat modeling system may further determine a type of each function or procedure. For example, the types may be displaying functions, calculating functions, input functions, etc. The threat modeling system may then input a type for each function or procedure into the machine learning model together with that function or procedure. In some embodiments, the machine learning model may be trained based on those functions or procedures so a prediction may be made based on the training.

When the threat modeling system obtains the plurality of potential threats (e.g., via receiving threat identifier for the potential threats), the threat modeling system may determine risk data associated with those potential threat identifiers. In particular, the threat modeling system may generate, based on the plurality of potential threats, risk data for the plurality of potential threats. The risk data may identify for each potential threat one or more potential risks associated with a corresponding potential threat. For example, the risk data may include various parameters associated with the threats returned by the machine learning model. Those parameters may indicate the type of threat, possible impact, etc.

In addition, the threat modeling system may receive risk mitigation data associated with the code base. The risk mitigation data may represent one or more potential threats that were addressed for the code base. For example, when an operator submits the code base to be analyzed, the operator may be asked to enter data about which threats were considered during application design/build stages and how they were mitigated during those stages. In some embodiments, the threat modeling system may match the threats input by the operator to known threats within a database and may store threat identifiers associated with the matching threats.

In some embodiments, the threat modeling system may use natural language processing to generate risk mitigation data. As discussed above, an operator may enter a description of the steps taken during the design/build out stage of the application. The threat modeling system may take that data and input that data into a natural language processing model to obtain risk mitigation parameters associated with the application. Based on those parameters, the threat modeling system may identify threats that have been addressed and generate risk mitigation data for those threats.

The threat modeling system may then generate, based on the risk data and the risk mitigation data, a threat level for the application. For example, the modeling system may determine one or more unmitigated risks associated with that application. That is, the threat modeling system may compare the threats to the application determined by the machine learning model with threats that are part of the risk mitigation data. Based on the comparison, the threat modeling system may identify threats that have not been mitigated, for example, during application design and built out. Based on those threats, the modeling system may determine a threat level for the application. The threat level may take various forms. For example, a threat level may be a score on a particular scale, a ratio, a percentage, or another suitable threat level.

In some embodiments, the threat modeling system may determine whether a threat model is complete and if not, update the threat model. In particular, the threat modeling system may receive a threat model associated with an application. The threat model may include a textual representation of one or more threats for the application. Furthermore, the textual representation may include, for each threat, one or more of a corresponding threat vector, a corresponding threat agent, a corresponding threat impact, or a corresponding computing component.

The threat modeling system may process the threat model and display it to an operator in a readable format. In particular, the threat modeling system may generate for display a representation of the threat model, such that the representation may be viewed by an operator. For example, the threat model may be received as an encoded file such as an Extensible Markup Language (XML). The threat modeling system may decode the file and generate for display the threat model. In some embodiments, the file may be encrypted. Thus, the threat modeling system may decrypt the file.

When the threat model is displayed, the operator may identify any issues with the threat model (e.g., missing threats) and input that data for processing by the threat modeling system. The threat modeling system may determine, based on input from the operator, that the threat model is incomplete. The input from the operator may include a new threat vector, a new threat agent, a new threat impact and a new computing component. For example, the display of the threat model may include an input/prompt field to enable the operator to enter the data as either a natural language input or as a selection of options (e.g., via a drop-down menu). The operator may indicate a threat vector (e.g., application data breach), a threat agent (e.g., internal user), a new impact (e.g., compromised user data), and/or a computing component (e.g., a database or an application server).

The threat modeling system may then generate a new threat statement for updating the threat model. In particular, the threat modeling system may input the new threat vector, the new threat agent, the new threat impact, and the new computing component into a large language model to obtain a new threat statement for the threat model. The large language model may use the textual representation of the threat model as a prompt for generating the new threat statement. For example, the threat modeling system may use the threat statements within the existing threat model as training data for the large language model. The threat modeling system may input those threat statements with a prompt to create a new threat statement using the user's input of the new threat vector, the new threat agent, the new threat impact, and the new computing component.

The threat modeling system may then update the threat model based on the new threat statement. For example, the threat modeling system may update the data structure associated with the threat model to include the new threat statement. In some embodiments, the threat modeling system may use an Application Programming Interface (API) to perform the update.

In some embodiments, the threat modeling system may detect errors within a threat model (e.g., within threat statements of the threat model). In particular, the threat modeling system may input, for each threat of the threat model, one or more of the corresponding threat vector, the corresponding threat agent, the corresponding threat impact, or the corresponding computing component into an error determination machine learning model to obtain one or more threat model errors for the threat model. The error determination machine learning model may have been one that has been trained to identify threat model errors based on textual representations of threat models. For example, a particular threat statement within a threat model may not have an impact component (e.g., because the creator of the threat statement did not add the impact component). Thus, the error determination machine learning model may detect that error and other errors.

The threat modeling system may then determine, for the one or more threat model errors, corresponding one or more threat model components. Those components may include a missing threat agent, a missing threat vector, etc. In some embodiments, the output of the error determination machine learning model may indicate that the error is related to, for example, a threat agent of a particular threat statement within the threat model. The error may also indicate that the threat agent for that particular threat statement is missing or is invalid in view of other components of that threat statement.

The threat modeling system may then provide the error to the operator so that the operator is enabled to input the missing or invalid data. In particular, the threat modeling system may generate for display, on an operator device, the one or more threat model errors and representations of the corresponding one or more threat model components. The operator may then input the missing or invalid data. The threat modeling system may then receive, from the operator device, corrections to the one or more threat model errors and update the threat model based on the corrections. For example, the threat modeling system may receive the inputted data and add the data to the corresponding threat statement within the threat model.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of data structure for storing the code base, in accordance with one or more embodiments of this disclosure.

FIG. 3 illustrates an excerpt of a data structure for storing threats received from the machine learning model, in accordance with one or more embodiments of this disclosure.

FIG. 7 is a flowchart of operations for measuring threat levels of applications, in accordance with one or more embodiments of this disclosure.

FIG. 8 is a flowchart of operations for updating threat models, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
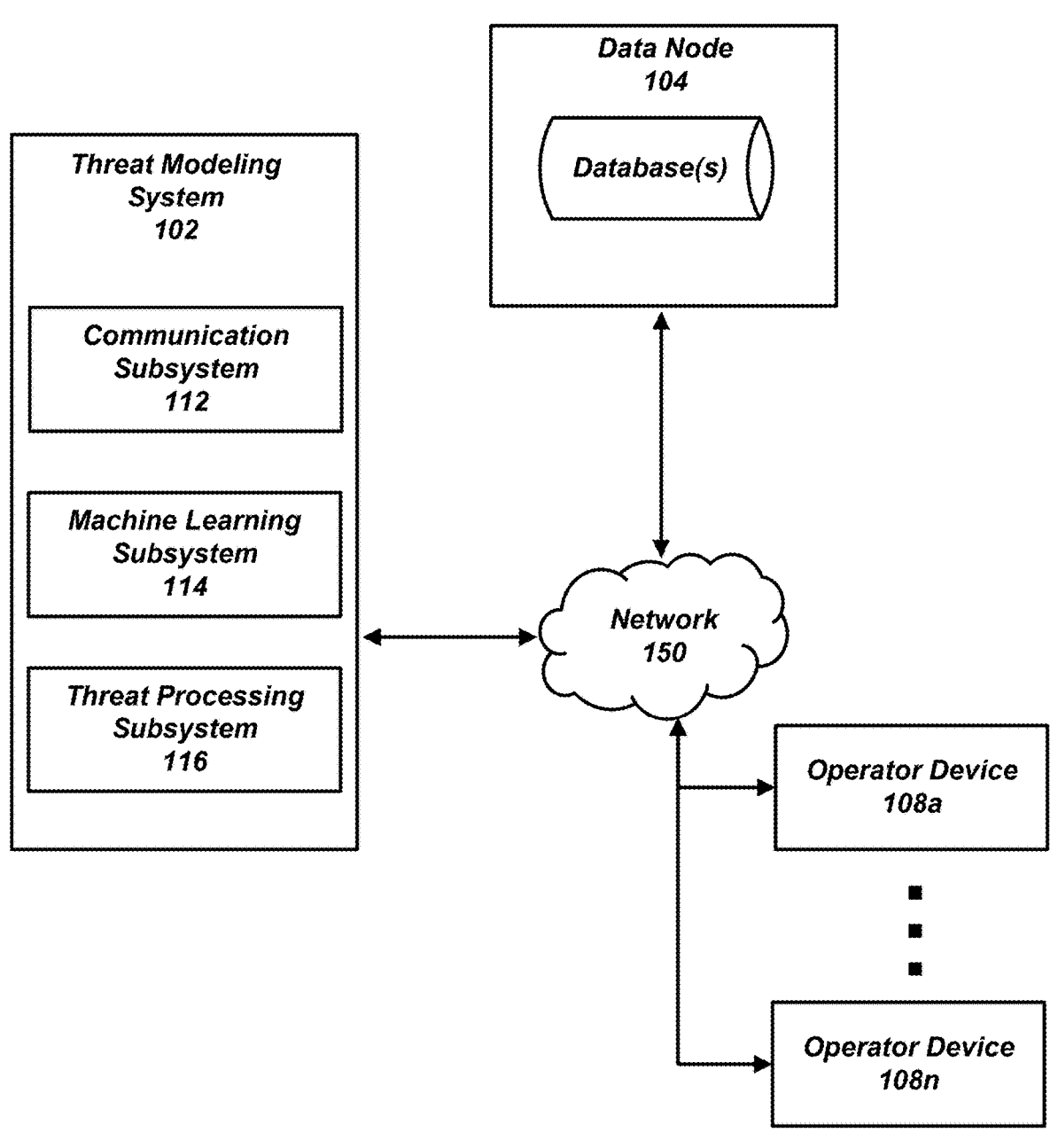
FIG. 1 shows an illustrative system for identifying application threat levels and evaluating threat models, in accordance with one or more embodiments of this disclosure.

FIG. 1 is an example of environment 100 for identifying application threat levels and evaluating threat models. Environment 100 includes threat modeling system 102, data node 104, and operator devices 108a-108n. Threat modeling system 102 may execute instructions for identifying application threat levels and evaluating threat models. Threat modeling system 102 may include software, hardware, or a combination of the two. For example, threat modeling system 102 may be a physical server or a virtual server that is running on a physical computer system. In some embodiments, threat modeling system 102 may be configured on a user device (e.g., a laptop computer, a smart phone, a desktop computer, an electronic tablet, or another suitable user device).

Data node 104 may store various data, including one or more machine learning models, training data, threat models, and/or other suitable data. In some embodiments, data node 104 may also be used to train machine learning models. Data node 104 may include software, hardware, or a combination of the two. For example, data node 104 may be a physical server or a virtual server that is running on a physical computer system. In some embodiments, threat modeling system 102 and data node 104 may reside on the same hardware and/or the same virtual server/computing device. Network 150 may be a local area network, a wide area network (e.g., the Internet), or a combination of the two. Operator devices 108a-108n may be end-user computing devices (e.g., desktop computers, laptops, electronic tablets, smart phones, and/or other computing devices used by end users) that may include microphone(s).

Threat modeling system 102 may include communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may send and receive data for the threat modeling system. In some embodiments, communication subsystem 112 may receive data from operator devices 108a-108n. Communication subsystem 112 may pass received data, or a pointer to the received data in memory, to machine learning subsystem 114. Machine learning subsystem 114 may include software components, hardware components, or a combination of both. For example, machine learning subsystem 114 may include software components (e.g., API calls) that access one or more machine learning models. Threat modeling system 102 may include threat processing subsystem 116. Threat processing subsystem 116 may include software components, hardware components, or a combination of both.

In some embodiments, threat modeling system 102 may use a code base associated with an application to identify threats to the application. A threat may be a potential negative action or event facilitated by a vulnerability that results in an unwanted impact to the application. Thus, threat modeling system 102 may receive a code base associated with an application. The code base may include computer code associated with the application. The computer code may include programming instructions that may be executed by a computer processor. In some embodiments, threat modeling system 102 may access the code base in a code base repository and may retrieve that code base. Threat modeling system 102 may use communication subsystem 112 to receive/retrieve the code base.

Threat modeling system 102 may then use a machine learning model to identify any threats within the code base. In particular, communication subsystem 112 may pass the code base or a pointer to the code base in memory to machine learning subsystem 114. Machine learning subsystem 114 may then input the code base into a machine learning model to obtain a plurality of potential threats associated with the application. The machine learning model may be one that has been trained to identify threats within code bases of applications. For example, the machine learning model may be trained using various code bases that may be labelled with corresponding threats. Based on the labelling, a training routine of the machine learning model may assign weights to various portions of the machine learning model.

In some embodiments, in addition to or instead of the code base, threat modeling system 102 may use an infrastructure diagram to identify threats for an application. For example, threat modeling system 102 may receive an infrastructure diagram associated with the application. The infrastructure diagram may be a representation of infrastructure components for the application. The infrastructure diagram may include components such as computing devices that execute at least a portion of the application. For example, the infrastructure diagram may include one or more server devices. In addition, the infrastructure diagram may include links (e.g., network connections) between computing devices and/or network components such as routers and switches.

In some embodiments, machine learning subsystem 114 may input the infrastructure diagram into the machine learning model. Machine learning subsystem 114 may input the infrastructure diagram into the machine learning model together with the code base or instead of the code base. Accordingly, the machine learning model may be trained to identify threats within infrastructure diagrams or within code bases and infrastructure diagrams in combination. For example, the training routine of the machine learning model may take, as input, an infrastructure diagram and a code base with each pair being labelled for a particular set of threats. The training routing of the machine learning model may use that labelled data to train the machine learning model.

In some embodiments, the code base may be split into functions and/or procedures and stored in a data structure before being input into the machine learning model. FIG. 2 illustrates an excerpt of data structure 200 that may store the code base. Data structure 200 may include functions 203, 206, 209, and 212 with corresponding function code for each function. The function code may be textual while each function may be represented by a function identifier, such as a name or another suitable identifier.

When the machine learning model processes the code base, the machine learning model may return one or more threats associated with the code base and/or the infrastructure diagram. Thus, machine learning subsystem 114 may receive one or more threats from the machine learning model. The threats may be received in the form of threat identifiers coupled with a corresponding probability or score. FIG. 3 illustrates an excerpt of a data structure 300 storing threats received from the machine learning model. Field 303 may store a threat identifier and field 306 may store a threat score which may correspond to a probability or to another score indicating how likely that threat is. In some embodiments, the threat identifiers in field 303 may correspond to threat identifiers stored in a database. The threat identifiers within the database may be stored in connection with other threat data such as threat description, threat vector, threat effects, etc.

Figure 4:
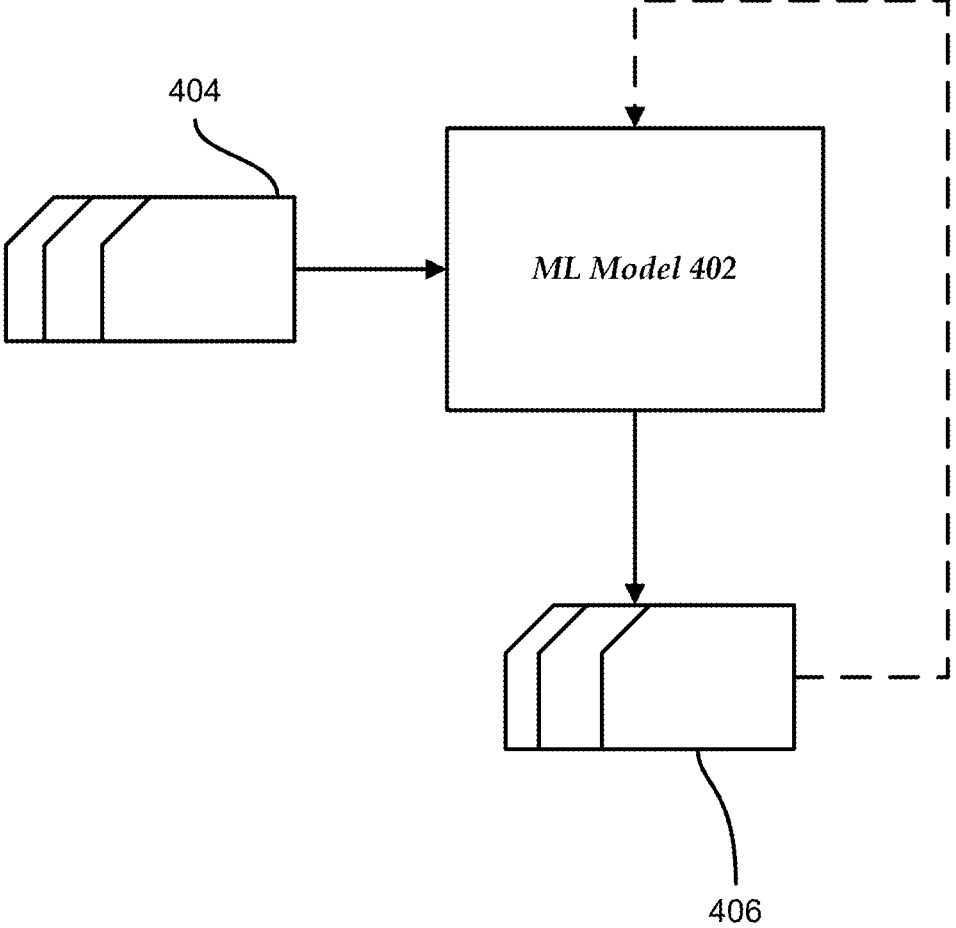
FIG. 4 illustrates an exemplary machine learning model, in accordance with one or more embodiments of this disclosure.

FIG. 4 illustrates an exemplary machine learning model for identifying threats associated with code bases and/or infrastructure diagrams. As discussed above, the machine learning model may have been trained using a plurality of code bases and/or infrastructure diagrams labelled with associated threats. Machine learning model 402 may take input 404 (e.g., a code base and/or an infrastructure diagram) and may output one or more threat identifiers 406 for threats predicted based on that code base and/or infrastructure diagram together with other output parameters. One or more output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

When the threats (e.g., threat identifiers) are received, machine learning subsystem 114 may pass those threats to threat processing subsystem 116. Threat processing subsystem 116 may then use the threats (e.g., threat identifiers) to compare with the risk data and then generate a threat level based on the comparing risk data. In particular, threat processing subsystem 116 may generate, based on the plurality of potential threats, risk data for the plurality of potential threats. The risk data may identify, for each potential threat, one or more potential risks associated with a corresponding potential threat. In some embodiments, the risk data may be stored with a corresponding threat identifier. The risk data may include, for each threat, a threat vector, a threat agent, a threat impact, and a corresponding component that is involved in the threat.

In some embodiments, threat processing subsystem 116 may retrieve the risk data from a database using the following operations. In particular, threat processing subsystem 116 may generate the risk data (e.g., a data structure storing the risk data) for the plurality of potential threats by initially receiving, from the machine learning model, a plurality of risk identifiers associated with a plurality of risks. Each risk identifier may be in a form of a string, a decimal number, a hexadecimal number, or in another suitable form. Threat processing subsystem 116 may then generate a database request or a database query that includes each risk identifier. The database query may request any risk data matching each particular threat identifier. Threat processing subsystem 116 may then transmit, to a database, a request that includes the query for a plurality of risk parameters associated with the plurality of risks. The request may include the plurality of risk identifiers. In response to the request, threat processing subsystem 116 may receive, from the database, the risk data. The risk data may include the plurality of risk parameters.

Threat processing subsystem 116 may also receive risk mitigation data so it could be used to determine unmitigated risks. Risk mitigation data may correspond to threats that have been addressed by the application during, for example, application design and/or build out. Thus, threat processing subsystem 116 may receive risk mitigation data associated with the code base. The risk mitigation data may represent one or more potential threats that were addressed for the code base. In some embodiments, risk mitigation data may represent one or more potential threats that were addressed for the infrastructure diagram and/or the code base.

Threat processing subsystem 116 may use the following operations to receive or retrieve risk mitigation data. Threat processing subsystem 116 may receive natural language input describing one or more risk mitigation mechanisms associated with the application. For example, during design and/or build out stages of the application, engineers may have entered notes or other metadata relating to potential threats and how the design/build of the application addresses those potential threats. That natural language input may have been stored within the application or in a database (e.g., within data node 104). Thus, threat processing subsystem 116 may retrieve that data from its source.

Threat processing subsystem 116 may then use a natural language processing model to process the natural language input for risk mitigation data. In some embodiments, threat processing subsystem 116 may input the natural language input into a natural language processing model to obtain a plurality of risk mitigation parameters associated with the application. For example, the natural language processing model may be a machine model trained to identify risk mitigation parameters such as threat vector, threat actor, computing component, etc., from natural language text. The natural language processing model may have been trained using words and phrases corresponding to different risk mitigation parameters that are labelled appropriately. For example, a phrase indicating that an internal user may improperly access the application database may be labeled with a threat actor "internal user" and as threat vector "database access." Thus, the natural language machine learning model may be trained using those parameters.

When the natural language process model outputs the risk mitigation factors, threat processing subsystem 116 may generate risk mitigation data. In particular, threat processing subsystem 116 may generate the risk mitigation data based on the plurality of risk mitigation parameters. For example, threat processing subsystem 116 may generate a data structure that includes the risk mitigation factors.

In some embodiments, threat processing subsystem 116 may use the following operations (e.g., with help from one or more operators) to receive the risk mitigation data associated with the application (e.g., risk mitigation data associated with the code base and/or architectural diagram). Threat processing subsystem 116 may retrieve, from a risk mitigation database, a plurality of potential risk mitigations. For example, threat processing subsystem 116 may query the risk mitigation database for a plurality of potential risk mitigations. The query may be based on risk mitigation data included with the application. As described above, the risk mitigation data may be natural language text input by designers and/or builders of the application.

Threat processing subsystem 116 may determine a plurality of operators associated with the application. For example, each application may be associated with one or more operators (e.g., application assessors). Each assessor may have an identifier stored in a database in association with the application with each assessor being able to receive data (e.g., via a device identifier and/or mailbox identifier). Threat processing subsystem 116 may then transmit a plurality of representations of the plurality of potential risk mitigations to the plurality of operators. For example, threat processing subsystem 116 may transmit natural language input to the plurality of operators. Threat processing subsystem 116 may then receive, from the plurality of operators a set of risk mitigation representations representing the risk mitigation data. For example, each assessor may review the data received from threat processing subsystem 116 and may edit/add/replace certain data to generate a portion of the risk mitigation data and then transmit that data to threat processing subsystem 116.

In some embodiments, when the risk mitigation data has been generated, it may be used to determine unmitigated risks for the application. In particular, threat processing subsystem 116 may compare the risk mitigation data with the risk data to determine one or more risk identifiers corresponding to unmitigated risks. For example, there may be five potential threats to the application and two mitigated risks that may correspond to two of the five potential threats. Accordingly, threat processing subsystem 116 may determine, based on the comparison, that there are three unmitigated risks.

Threat processing subsystem 116 may then generate, based on the risk data and the risk mitigation data, a threat level for the application. For example, threat processing subsystem 116 may determine which risks are unmitigated and determine based on those unmitigated risks a threat score for the application. In some embodiments, each unmitigated risk may be associated with a particular score (e.g., based on the severity of the unmitigated risk). Threat processing subsystem 116 may retrieve those scores from, for example, a database residing on node 104 and combine those scores to generate a threat level. The threat level may be an aggregation of those scores.

In some embodiments, threat processing subsystem 116 may perform the following operations when generating a threat level for the application. Threat processing subsystem 116 may determine a difference between the risk data and the risk mitigation data. The difference may include a plurality of difference parameters that are within the risk data and are not within the risk mitigation data. For example, threat processing subsystem 116 may input the risk mitigation data (e.g., retrieved from the application) into a model that may generate risk mitigation parameters including various threat vectors, threat actors, components under threat, and/or other risk mitigation parameters. In addition, threat processing subsystem 116 may retrieve risk parameters associated with different risks to the application. Then, threat processing subsystem 116 may determine which parameters within the risk threats are not within the risk mitigation parameters, and based on that determination, generate risk parameters that are unmitigated.

Threat processing subsystem 116 may then generate the threat level based on the plurality of difference parameters. For example, threat processing subsystem 116 may perform a database lookup using an identifier associated with each different parameter for a threat level for that parameter. Threat processing subsystem 116 may then aggregate (e.g., add, average, etc.) the threat levels for all the parameters. In some embodiments, threat processing subsystem 116 may inform application operators (e.g., assessors) of the parameters. Thus, threat processing subsystem 116 may generate a message that includes the plurality of difference parameters and transmit the message to one or more operators. Threat processing subsystem 116 may transmit the message through one or more channels, including the application itself, electronic mail, text messaging such as Simple Message Service (SMS) message, and/or through another suitable channel.

In some embodiments, threat processing subsystem 116 may generate a threat model in addition to or instead of a threat level. In particular threat processing subsystem 116 may generate, based on the risk data and the risk mitigation data, a threat model for the application. The threat model may include risk parameters associated with the risk data, the plurality of risk mitigation parameters, and a description associated with the code base. For example, threat processing subsystem 116 may determine unmitigated potential threats and add associated threat parameters to a threat model. In some embodiments, the threat model may be in a form of a file (e.g., an XML file, a text, file, or another type of file). In some embodiments, the threat model may be a structured file or a database file.

In some embodiments, threat processing subsystem 116 may receive input from an operator to validate the threat model. In particular, threat processing subsystem 116 may provide the threat model to an operator with a prompt to edit the threat model. The prompt may include a plurality of user interface elements that enable the operator to edit a plurality of components of the threat model. In addition, the plurality of components of the threat model may include the risk parameters, the plurality of risk mitigation parameters, the code base, or an infrastructure diagram. For example, threat processing subsystem 116 may transmit a message, to a device associated with an operator, (e.g., an assessor) a request to review the threat model such that the operator is enabled to edit the current threats, add threats, and/or remove threats from the threat model.

Threat processing subsystem 116 may then receive, from the operator, a plurality of changes to the threat model and recalculate the threat level based on the plurality of changes. For example, threat processing subsystem 116 may generate for display a user interface for an operator (e.g., an assessor) that allows an assessor to input text data into an existing potential threat, thereby editing the threat. In addition, the user interface may enable the assessor to remove threats and add new threats. When the operator is finished with the changes, the operator may submit the updated threats to threat processing subsystem 116. Threat processing subsystem 116 may receive the updated threat model and update the threat model (e.g., with a file or a database). When the updates are received, threat processing subsystem 116 may recalculate the threat level to the application based on the updated threat model.

Figure 5:
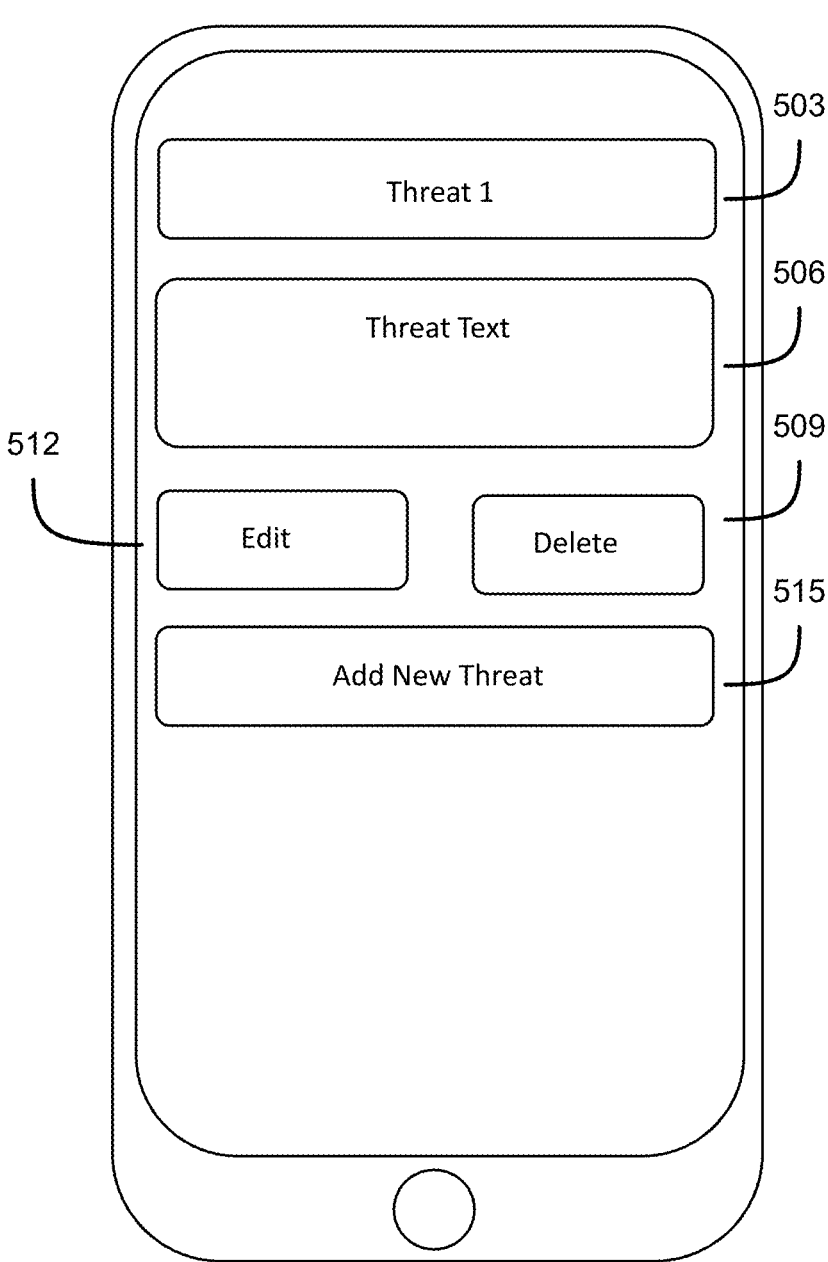
FIG. 5 illustrates a graphical user interface for updating threat models, in accordance with one or more embodiments of this disclosure.

FIG. 5 illustrates an exemplary interface 500 for displaying threats to an operator. Field 503 may indicate a threat identifier, a threat label, or a threat name. Field 506 may include a text associated with the threat. Field 506 may become editable when button 512 is selected by an operator. Furthermore, when a user selects button 509, the threat text and/or the full threat may be removed from the user interface and may signal to threat processing subsystem 116 to remove the threat when the data is sent back to threat processing subsystem 116. Button 515 may be selected by an operator to generate a new threat. For example, a new user interface with blank field 506 may be generated.

In some embodiments, threat processing subsystem 116 may use a machine learning model to recalculate or calculate the threat level. In particular, threat processing subsystem 116 may use machine learning subsystem 114 to input the risk parameters and the plurality of risk mitigation parameters into a threat level generation machine learning model. The threat level generation machine learning model may be one that has been trained to generate threat levels based on the risk data and the plurality of risk mitigation parameters. The threat level generation machine learning model may use the input to generate a prediction of a threat level. For example, the threat level may be a numeric score or a scaled score (e.g., low, medium or high). In some embodiments, the threat level may take another form. Thus, threat processing subsystem 116 may receive the threat level from the machine learning model. The threat level generation machine learning model may be one illustrated in FIG. 4.

As discussed above, in some embodiments, threat modeling system 102 may evaluate (e.g., using a machine learning model) threat models for quality. Threat modeling system 102 may receive a threat model associated with an application. In some embodiments, the threat model may include a textual representation of one or more threats for the application. The textual representation may include, for each threat, one or more of a corresponding threat vector, a corresponding threat agent, a corresponding threat impact, or a corresponding computing component.

In some embodiments, the threat model may be a structured file that includes textual and graphical data. For example, a threat model may be a structured file such as an XML file, a database component (e.g., a database table), or another suitable data structure. The structured file may include graphics such as an architectural diagram of the application and/or other graphics data. Threat modeling system 102 may receive the threat model via communication subsystem 112, which may pass the threat model to machine learning subsystem 114.

In some embodiments, machine learning subsystem 114 may determine whether the threat model has any errors using a machine learning model. In particular, machine learning subsystem 114 may input, for each threat, the corresponding threat vector, the corresponding threat agent, the corresponding threat impact and the corresponding computing component into an error determination machine learning model to obtain one or more threat model errors for the threat model. The error determination machine learning model may be one that has been trained to identify threat model errors based on textual representations of threat models. For example, machine learning subsystem 114 may train the error determination machine learning model based on a training dataset that includes multiple threats with each threat having a corresponding threat vector, a corresponding threat agent, a corresponding threat impact and a corresponding computing component. The error determination machine learning model may be a model shown in FIG. 4.

Based on the output of the error determination machine learning model, machine learning subsystem 114 may identify components (e.g., application components) associated with those threats. In particular, machine learning subsystem 114 may determine, for the one or more threat model errors, corresponding one or more threat model components. For example, the error determination machine learning model may output one or more identifiers associated with one or more errors. In addition, the output may include an identifier of a particular threat within the threat model to which each error corresponds. Based on the identifier, machine learning subsystem 114 may determine the threat model component (e.g., a particular threat that has an error).

In some embodiments, when the component (e.g., the threat) having the error has been identified, machine learning subsystem 114 may use an operator to fix the error. In particular, machine learning subsystem 114 may generate for display on an operator device the one or more threat model errors and representations of the corresponding one or more threat model components. For example, machine learning subsystem 114 may generate a display similar to one shown in FIG. 5. However, the display may indicate where the errors have been found. The operator may then be enabled to make changes in each threat with the error and transmit the changes to machine learning subsystem 114.

Threat modeling system 102 may then receive, from the operator device, corrections to the one or more threat model errors. Once the corrections are received, threat modeling system 102 may update the threat model based on the corrections. For example, threat modeling system 102 may update an XML file with updated information. When updating the threat model based on the corrections, threat modeling system 102 may perform the updates to threat statements within the threat models, such that each threat statement corresponds to a particular threat. Thus, threat modeling system 102 may identify, based on the corrections, one or more threat statements within the threat model to be corrected. For example, threat modeling system 102 may receive, from the device of the operator, a data structure or file (e.g., an XML file) that includes updates to specific threat statements. Based on the received data, threat modeling system 102 may generate updated threat statements based on the corrections.

In some embodiments, threat modeling system 102 may generate a score for the model based on the errors (e.g., prior to the errors being corrected). In particular, threat modeling system 102 may generate a model score for the threat model based on a number of threat model errors, a type of threat level errors, and a number of threat statements within the threat model. Threat modeling system 102 may generate a score using a machine learning model or another suitable model. The machine learning model may be trained using a training set that includes a plurality of threat model errors with corresponding types and corresponding threat statements that are labelled with various scores.

In some embodiments, each threat statement may be split into components and a model score may be determined for each component. The scores may then be aggregated. In particular, machine learning subsystem 114 may generate a plurality of model score components affecting the model score. The plurality of model score components may include a threat vector component, a threat agent component, a threat impact component, and a computing component. For example, each of these components may be assigned a particular score with the scores aggregated (e.g., averaged, added, etc.) to arrive at the score for that particular threat statement or threat.

In some embodiments, machine learning subsystem 114 may generate an explanation for the model score. In particular, machine learning subsystem 114 may generate, based on the threat vector component, the threat agent component, the threat impact component, and the computing component, an explanation of the model score. For example, machine learning subsystem 114 may generate a corresponding score for each component and demonstrate how those scores (e.g., based on addition, averaging, etc.) aggregate to the model score. In some embodiments, machine learning subsystem 114 may use a machine learning model to explain the model score. In particular, machine learning subsystem 114 may generate the explanation of the model score by inputting the corresponding threat vector, the corresponding threat agent, the corresponding threat impact, and the corresponding computing component into a score explanation machine learning model. The score explanation machine learning model may be trained to determine a score for each component (e.g., threat vector, threat agent, threat impact, etc.) and explain how those components have been aggregated (e.g., weighted using weights of the machine learning model) to arrive at the model score.

In some embodiments, threat modeling system 102 may determine that the threat model is incomplete and provide a completed model using operator help. In particular, threat modeling system 102 may generate for display a representation of the threat model, which may be viewed by an operator. For example, threat modeling system 102 may generate for display on an operator device (e.g., a model assessor device) one or more threat model statements associated with threat model. The operator may determine, based on the application and the model, that the model is incomplete and may add data (e.g., one or more threat statements) to the model, which may be sent back to threat modeling system 102.

Threat modeling system 102 may determine, based on input from the operator, that the threat model is incomplete. The operator's input may include a new threat vector, a new threat agent, a new threat impact and a new computing component. For example, threat modeling system 102 may receive a data structure or a file from the operator's device that includes a new threat statement complete with a new threat vector, a new threat agent, a new threat impact, a new threat component, etc. Based on the new data, threat modeling system 102 may determine that the threat model is incomplete based on the operator's judgment.

Based on the data, machine learning subsystem 114 may generate a new statement using a large language model. For example, machine learning subsystem 114 may input the new threat vector, the new threat agent, the new threat impact and the new computing component into a large language model to obtain a new threat statement for the threat model. The large language model may use the textual representation of the threat model as a prompt for generating the new threat statement. For example, machine learning subsystem 114 may use an API to interface with the large language model and input the new threat and the textual representation into the large language model.

Based on the new threat statement, threat modeling system 102 may update the threat model by including the new threat statement within the data structure associated with the threat model. In some embodiments, threat modeling system 102 may update the threat model based on both the new threat statement and the corrections to the current threat statements as described above.

In some embodiments, machine learning subsystem 114 may generate a training prompt for the large language model to train the large language model using a plurality of threat vectors, a plurality of threat agents, and a plurality of impacts to identify errors threat vectors, threat agents, and impacts. For example, machine learning subsystem 114 may access the threat model and retrieve each threat statement or threat from the threat model. Machine learning subsystem 114 may then split each threat statement or threat into components such as threat vectors, threat agents, threat impacts, etc., to generate a prompt for the large language model. Machine learning subsystem 114 may then input the prompt into the large language model.

In some embodiments, the operator's input may need to be supplemented (e.g., based on the completeness of the threat statement). For example, machine learning subsystem 114 may determine (e.g., using a machine learning model as described above) whether the operator's input creates a threat statement or threat without any errors. Thus, machine learning subsystem 114 may determine, based on the input of the operator, one or more additional prompts for the operator. For example, the prompts may indicate to the operator portions of the threat statement that were missed during an original prompt to input a new threat statement. Machine learning subsystem 114 may then receive, from the operator, additional input in response to the one or more additional prompts. That input may be those missing components of the threat statement. Machine learning subsystem 114 may then input the additional input into the large language model.

As discussed above, machine learning subsystem 114 may determine whether the new threat statement has errors (e.g., whether it is incomplete). Thus, machine learning subsystem 114 may receive, from the large language model, the new threat statement for the threat model. Machine learning subsystem 114 may then input the new threat statement into an error determination machine learning model to obtain one or more threat statement errors. In some embodiments, machine learning subsystem 114 may then fix the error with the help of the operator as discussed above.

Computing Environment

Figure 6:
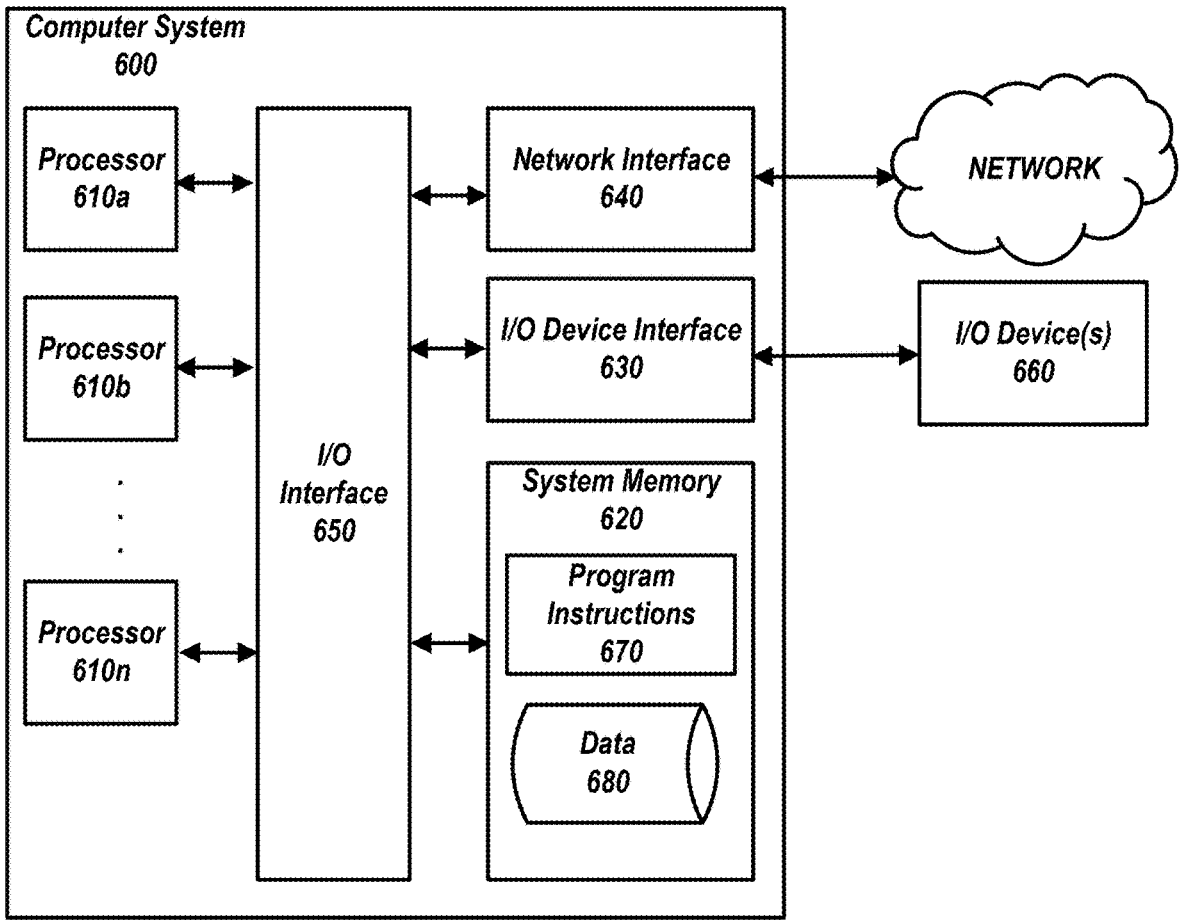
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

FIG. 7 is a flowchart 700 of operations for measuring threat levels of applications. The operations of FIG. 7 may use components described in relation to FIG. 6. In some embodiments, threat modeling system 102 may include one or more components of computer system 600. At 702, threat modeling system 102 receives a code base associated with an application. For example, threat modeling system 102 may receive the code base from data node 104 or from one of operator devices 108a-108n. Threat modeling system 102 may receive the code base over network 150 using network interface 640.

At 704, threat modeling system 102 inputs the code base into a machine learning model to obtain a plurality of potential threats associated with the application. Threat modeling system 102 may use one or more processors 610a, 610b, and/or 610n to perform this operation. At 706, threat modeling system 102 generates, based on the plurality of potential threats, risk data for the plurality of potential threats. For example, threat modeling system 102 may use one or more processors 610a-610n to perform the operation and store the results in system memory 620.

At 708, threat modeling system 102 receives risk mitigation data associated with the code base. For example, threat modeling system 102 may receive the risk mitigation data from data node 104, from one of operator devices 108a-108n, or from an application install. Threat modeling system 102 may receive the risk mitigation data over network 150 using network interface 640. At 710, threat modeling system 102 generates, based on the risk data and the risk mitigation data, a threat level for the application. For example, threat modeling system 102 may use one or more processors 610a-610n to perform the operation and store the results in system memory 620.

FIG. 8 is a flowchart 800 of operations for updating threat models. The operations of FIG. 8 may use components described in relation to FIG. 6. At 802, threat modeling system 102 receives a threat model associated with an application. For example, threat modeling system 102 may receive the threat model from data node 104 or from one of operator devices 108a-108n. Threat modeling system 102 may receive the threat model over network 150 using network interface 640.

At 804, threat modeling system 102 generates for display a representation of the threat model, wherein the representation is viewed by an operator. For example, threat modeling system 102 may use one or more processors 610a-610n to perform the operation and store the display data in system memory 620. At 806, threat modeling system 102 determines, based on input from the operator, that the threat model is incomplete. For example, threat modeling system 102 may use one or more processors 610a-610n to perform the operation.

At 808, threat modeling system 102 inputs the new threat vector, the new threat agent, the new threat impact and the new computing component into a large language model to obtain a new threat statement for the threat model. Threat modeling system 102 may use one or more processors 610a, 610b, and/or 610n to perform this operation. At 810, threat modeling system 102 updates the threat model based on the new threat statement. For example, threat modeling system 102 may use one or more processors 610a-610n to perform the operation and store the results in system memory 620.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a code base associated with an application, wherein the code base comprises computer code associated with the application; inputting the code base into a machine learning model to obtain a plurality of potential threats associated with the application, wherein the machine learning model has been trained to identify threats within code bases of applications; generating, based on the plurality of potential threats, risk data for the plurality of potential threats, wherein the risk data identifies, for each potential threat, one or more potential risks associated with a corresponding potential threat; receiving risk mitigation data associated with the code base, wherein the risk mitigation data represents one or more potential threats that were addressed for the code base; and generating, based on the risk data and the risk mitigation data, a threat level for the application.

2. Any of the preceding embodiments, further comprising: determining, based on the code base, an infrastructure diagram associated with the application, wherein the infrastructure diagram comprises a representation of infrastructure components for the application; and inputting the infrastructure diagram into the machine learning model, wherein the machine learning model is further trained to identify the threats based on both a corresponding code base and a corresponding infrastructure diagram.

3. Any of the preceding embodiments, wherein generating the risk data for the plurality of potential threats further comprises: receiving, from the machine learning model, a plurality of risk identifiers associated with a plurality of risks; transmitting, to a database, a request for a plurality of risk parameters associated with the plurality of risks, wherein the request comprises the plurality of risk identifiers; and receiving, from the database, the risk data, wherein the risk data comprises the plurality of risk parameters.

4. Any of the preceding embodiments, wherein retrieving the risk mitigation data comprises: receiving natural language input describing one or more risk mitigation mechanisms associated with the application; inputting the natural language input into a natural language processing model to obtain a plurality of risk mitigation parameters associated with the application; and generating the risk mitigation data based on the plurality of risk mitigation parameters.

5. Any of the preceding embodiments, further comprising generating, based on the risk data and the risk mitigation data, a threat model for the application, wherein the threat model comprises risk parameters associated with the risk data, the plurality of risk mitigation parameters, and a description associated with the code base.

6. Any of the proceeding embodiments, further comprising: providing the threat model to an operator with a prompt to edit the threat model, wherein the prompt comprises a plurality of user interface elements that enable the operator to edit a plurality of components of the threat model, and wherein the plurality of components of the threat model comprises the risk parameters, the plurality of risk mitigation parameters, the code base, or an infrastructure diagram; receiving, from the operator, a plurality of changes to the threat model; and recalculating the threat level based on the plurality of changes.

7. Any of the preceding embodiments, wherein generating the threat level for the application comprises: inputting the risk parameters and the plurality of risk mitigation parameters into a threat level generation machine learning model, wherein the threat level generation machine learning model has been trained to generate threat levels based on the risk data and the plurality of risk mitigation parameters; and receiving the threat level from the machine learning model.

8. Any of the preceding embodiments, wherein receiving the risk mitigation data associated with the code base comprises: retrieving, from a risk mitigation database, a plurality of potential risk mitigations; determining a plurality of operators associated with the application; transmitting a plurality of representations of the plurality of potential risk mitigations to the plurality of operators; and receiving, from the plurality of operators, a set of risk mitigation representations representing the risk mitigation data.

9. Any of the preceding embodiments, wherein generating the threat level for the application further comprises: determining a difference between the risk data and the risk mitigation data, wherein the difference comprises a plurality of difference parameters that are within the risk data and are not within the risk mitigation data; and generating the threat level based on the plurality of difference parameters.

10. Any of the preceding embodiments, further comprising: generating a message comprising the plurality of difference parameters; and transmitting the message to one or more operators.

11. Any of the preceding embodiments, further comprising: splitting the code base according to a plurality of functions within the code base; determining a corresponding type associated with each function; and inputting the corresponding type associated with each function into the machine learning model.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

Further techniques will be better understood with reference to the following enumerated embodiments:

1. A method comprising: receiving a threat model associated with an application, wherein the threat model comprises a textual representation of one or more threats for the application, and wherein the textual representation comprises, for each threat, one or more of a corresponding threat vector, a corresponding threat agent, a corresponding threat impact, or a corresponding computing component; generating for display a representation of the threat model, wherein the representation is viewed by an operator; determining, based on input from the operator, that the threat model is incomplete, wherein the input comprises a new threat vector, a new threat agent, a new threat impact, and a new computing component; inputting the new threat vector, the new threat agent, the new threat impact and the new computing component into a large language model to obtain a new threat statement for the threat model, wherein the large language model uses the textual representation of the threat model as a prompt for generating the new threat statement; and updating the threat model based on the new threat statement.

2. Any of the preceding embodiments, further comprising: inputting, for each threat of the threat model, one or more of the corresponding threat vector, the corresponding threat agent, the corresponding threat impact, or the corresponding computing component into an error determination machine learning model to obtain one or more threat model errors for the threat model, wherein the error determination machine learning model has been trained to identify threat model errors based on textual representations of threat models; determining, for the one or more threat model errors, corresponding one or more threat model components; generating for display on an operator device the one or more threat model errors and representations of the corresponding one or more threat model components; receiving, from the operator device, corrections to the one or more threat model errors; and updating the threat model based on the corrections.

3. Any of the preceding embodiments, wherein updating the threat model based on the corrections further comprises: identifying, based on the corrections, one or more threat statements within the threat model to be corrected; and generating updated threat statements based on the corrections.

4. Any of the preceding embodiments, further comprising generating a model score for the threat model based on a number of threat model errors, a type of threat level errors, and a number of threat statements within the threat model.

5. Any of the preceding embodiments, further comprising generating a plurality of model score components affecting the model score, wherein the plurality of model score components comprises a threat vector component, a threat agent component, a threat impact component, and a computing component.

6. Any of the proceeding embodiments, further comprising generating, based on the threat vector component, the threat agent component, the threat impact component, and the computing component, an explanation of the model score.

7. Any of the preceding embodiments, wherein generating the explanation of the model score comprises: inputting the corresponding threat vector, the corresponding threat agent, the corresponding threat impact, and the corresponding computing component into a score explanation machine learning model.

8. Any of the preceding embodiments, further comprising: determining, based on the input of the operator, one or more additional prompts for the operator; receiving, from the operator, additional input in response to the one or more additional prompts; and inputting the additional input into the large language model.

9. Any of the preceding embodiments, further comprising: generating a training prompt for the large language model to train the large language model using a plurality of threat vectors, a plurality of threat agents, and a plurality of impacts to identify errors threat vectors, threat agents, and impacts; and inputting the prompt into the large language model.

10. Any of the preceding embodiments, wherein the threat model is a structured file comprising textual and graphical data.

11. Any of the preceding embodiments, further comprising: receiving, from the large language model, the new threat statement for the threat model; and inputting the new threat statement into an error determination machine learning model to obtain one or more threat statement errors.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

What is claimed is:

1. A system for updating threat models, the system comprising:

one or more processors; and a non-transitory, computer-readable storage medium storing instructions, which, when executed by the one or more processors cause the one or more processors to:

receive, from a data node, a file representing a data structure of a threat model associated with an application, wherein the threat model comprises a textual representation of one or more threats for the application, and wherein the textual representation comprises, for each threat, a corresponding threat vector, a corresponding threat agent, a corresponding threat impact and a corresponding computing component;

input, for each threat, the corresponding threat vector, the corresponding threat agent, the corresponding threat impact and the corresponding computing component into an error determination machine learning model to obtain one or more threat model errors for the threat model, wherein the error determination machine learning model has been trained to identify threat model errors based on textual representations of threat models;

receive, from an operator, corrections to the one or more threat model errors;

determine, based on input from the operator, that the threat model is incomplete, wherein the input comprises a new threat vector, a new threat agent, a new threat impact, and a new computing component;

input the new threat vector, the new threat agent, the new threat impact, and the new computing component into a large language model to obtain a new threat statement for the threat model, wherein the large language model uses the textual representation of the threat model as a prompt for generating the new threat statement; and update the threat model based on the corrections and the new threat statement, wherein updating the threat model comprises:

identifying, based on the corrections, one or more threat statements within the threat model to be corrected;

generating updated threat statements based on the corrections; and executing, via an application programming interface (API), a call to the data node to update the data structure associated with the threat model to include the updated threat statements.

2. A method comprising:

receiving, from a data node, a file representing a data structure of a threat model associated with an application, wherein the threat model comprises a textual representation of one or more threats for the application, and wherein the textual representation comprises, for each threat, one or more of a corresponding threat vector, a corresponding threat agent, a corresponding threat impact, or a corresponding computing component;

generating for display a representation of the threat model, wherein the representation is viewed by an operator;

determining, based on input from the operator, that the threat model is incomplete, wherein the input comprises, a new threat vector, a new threat agent, a new threat impact and a new computing component;

receiving, from an operator device, corrections to one or more threat model errors; and updating the threat model based on the corrections, wherein updating the threat model comprises:

identifying, based on the corrections, one or more threat statements within the threat model to be corrected;

generating updated threat statements based on the corrections; and executing, via an application programming interface (API), a call to the data node to update the data structure associated with the threat model to include the updated threat statements.

3. The method of claim 2, further comprising generating a model score for the threat model based on a number of threat model errors, a type of threat level errors, and a number of threat statements within the threat model.

4. The method of claim 3, further comprising generating a plurality of model score components affecting the model score, wherein the plurality of model score components comprises a threat vector component, a threat agent component, a threat impact component, and a computing component.

5. The method of claim 4, further comprising generating, based on the threat vector component, the threat agent component, the threat impact component, and the computing component, an explanation of the model score.

6. The method of claim 5, wherein generating the explanation of the model score comprises: inputting the corresponding threat vector, the corresponding threat agent, the corresponding threat impact, and the corresponding computing component into a score explanation machine learning model.

7. The method of claim 2, wherein the threat model is a structured file comprising textual and graphical data.

8. The method of claim 2, further comprising:

inputting the new threat vector, the new threat agent, the new threat impact and the new computing component into a large language model to obtain a new threat statement for the threat model, wherein the large language model uses the textual representation of the threat model as a prompt for generating the new threat statement; and updating the threat model based on the new threat statement and the corrections.

9. The method of claim 8, further comprising:

determining, for the one or more threat model errors, corresponding one or more threat model components; and generating for display on operator device the one or more threat model errors and representations of the corresponding one or more threat model components.

10. The method of claim 8, further comprising:

determining, based on the input of the operator, one or more additional prompts for the operator;

receiving, from the operator, additional input in response to the one or more additional prompts; and inputting the additional input into the large language model.

11. The method of claim 8, further comprising:

generating a training prompt for the large language model to train the large language model using a plurality of threat vectors, a plurality of threat agents, and a plurality of impacts to identify errors threat vectors, threat agents, and impacts; and inputting the prompt into the large language model.

12. The method of claim 8, further comprising:

receiving, from the large language model, the new threat statement for the threat model; and inputting the new threat statement into an error determination machine learning model to obtain one or more threat statement errors.

13. One or more non-transitory, computer-readable storage media storing instructions that when executed by one or more processors cause operations comprising:

receiving, from a data node, a file representing a data structure of a threat model associated with an application, wherein the threat model comprises a textual representation of one or more threats for the application, and wherein the textual representation comprises, for each threat, one or more of a corresponding threat vector, a corresponding threat agent, a corresponding threat impact or a corresponding computing component;

generating for display a representation of the threat model, wherein the representation is viewed by an operator;

determining, based on input from the operator, that the threat model is incomplete, wherein the input comprises, a new threat vector, a new threat agent, a new threat impact and a new computing component;

inputting at least part of the textual representation of the one or more threats for the application into an error determination machine learning model to obtain one or more threat model errors for the threat model;

receiving, from an operator device, corrections to the one or more threat model errors; and updating the threat model based on the corrections, wherein updating the threat model comprises:

identifying, based on the corrections, one or more threat statements within the threat model to be corrected;

generating updated threat statements based on the corrections; and executing, via an application programming interface (API), a call to the data node to update the data structure associated with the threat model to include the updated threat statements.

14. The one or more non-transitory, computer-readable storage media of claim 13, wherein the instructions further cause the one or more processors to generate a model score for the threat model based on a number of threat model errors, a type of threat level errors, and a number of threat statements within the threat model.

15. The one or more non-transitory, computer-readable storage media of claim 14, wherein the instructions further cause the one or more processors to generate a plurality of model score components affecting the model score, wherein the plurality of model score components comprises a threat vector component, a threat agent component, a threat impact component, and a computing component.

16. The one or more non-transitory, computer-readable storage media of claim 15, wherein the instructions further cause the one or more processors to generate, based on the threat vector component, the threat agent component, the threat impact component, and the computing component, an explanation of the model score.

17. The one or more non-transitory, computer-readable storage media of claim 16, wherein the instructions for generating the explanation of the model score further cause the one or more processors to input the corresponding threat vector, the corresponding threat agent, the corresponding threat impact, and the corresponding computing component into a score explanation machine learning model.

18. The one or more non-transitory, computer-readable storage media of claim 13, wherein the instructions further cause the one or more processors to perform operations comprising:

inputting the new threat vector, the new threat agent, the new threat impact and the new computing component into a large language model to obtain a new threat statement for the threat model, wherein the large language model uses the textual representation of the threat model as a prompt for generating the new threat statement; and updating the threat model based on the new threat statement and the corrections.

19. The one or more non-transitory, computer-readable storage media of claim 18, wherein the instructions further cause the one or more processors to perform operations comprising:

determining, for the one or more threat model errors, corresponding one or more threat model components;

generating for display on the operator device the one or more threat model errors and representations of the corresponding one or more threat model components.

20. The one or more non-transitory, computer-readable storage media of claim 18, wherein the instructions further cause the one or more processors to perform operations comprising:

determining, based on the input of the operator, one or more additional prompts for the operator;

receiving, from the operator, additional input in response to the one or more additional prompts; and inputting the additional input into the large language model.

* * * * *